Oct. 15, 1946.　　　B. L. ALLISON ET AL　　　2,409,178
MOUNTING MEANS FOR GYROSCOPES
Filed June 30, 1943
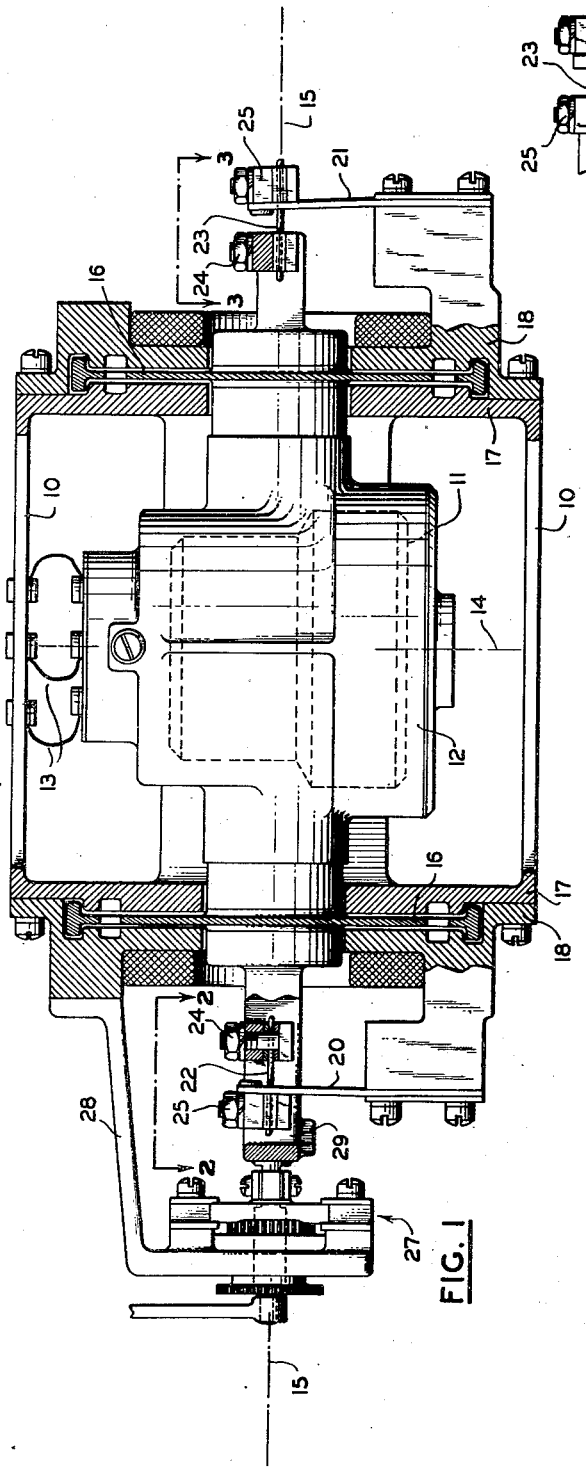
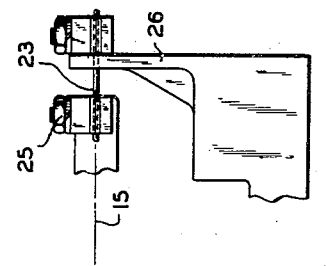
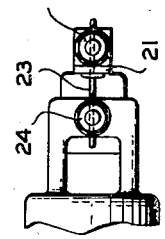
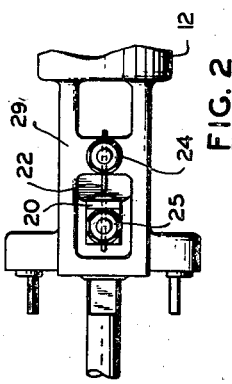
INVENTORS
BYRON L. ALLISON
LAN J. WONG
BY
Herbert N. Thompson
their ATTORNEY.

Patented Oct. 15, 1946

2,409,178

UNITED STATES PATENT OFFICE 2,409,178

MOUNTING MEANS FOR GYROSCOPES

Byron L. Allison, Williston Park, N. Y., and Lan J. Wong, Hoboken, N. J., assignors to Sperry Gyroscope Company, Inc., a corporation of New York Application June 30, 1943, Serial No. 492,866

8 Claims. (Cl. 248—26)

The present invention relates to a mounting for the rotor frame of a gyroscopic instrument. The type of instrument in which the improved mounting is particularly useful is an angular rate gyroscope of the highly accurate type.

The primary object of the invention is to provide a mounting for the rotor frame of such an instrument that properly supports the gyro rotor and will further withstand shocks and impacts without impairing the accuracy of the instrument.

One of the features of the invention resides in the employment of one or more loaded cantilever springs as a portion of the improved mounting.

Other objects, features and structural details of the invention will be apparent from the following description when read in relation to the accompanying drawing, wherein—

Fig. 1 is a vertical section of a gyroscopic instrument whose rotor frame is mounted in accordance with the teaching of the present invention;

Fig. 2 is a detail plan view looking in the direction of the arrows 2—2 in Fig. 1;

Fig. 3 is a view similar to Fig. 2 looking in the direction of arrows 3—3 in Fig. 1; and Fig. 4 is a detail elevation showing a modified form of the invention in which one of the cantilever springs of the mounting is replaced by a fixed post.

The preferred form of the invention is shown in Fig. 1, in which the gyroscopic instrument illustrated includes a casing 10 in which is mounted a rotor bearing frame 11 having a gyroscopic rotor 12 therein. Rotor 12 may be spun by a suitable motor (not shown) that is enclosed within the rotor bearing frame or case 11. Leads 13 between the casing 10 and frame 11 are employed in connecting the rotor spinning motor to a suitable source of electrical energy. Suitable bearings in the frame provide the spin axis of the rotor which is indicated at 14.

Frame 12 is pivotally mounted in the casing 10 about an axis that is perpendicular to the spin axis of the rotor. This axis is generally indicated at 15. Movement of the frame relative to the casing may be damped by a number of flanged discs 16 which are carried by the frame. The discs 16 fit closely within but out of contact with suitably shaped end members 17 and 18 which form a part of the casing. The lower portion of each of the thusly defined chambers contains a suitable damping fluid. Axis 15 is the precession axis about which frame 12 is displaced when the casing of the described type of angular rate gyroscopic instrument is angularly displaced about a horizontal axis; an axis normal to the plane of the paper as viewed in relation to Fig. 1.

In accordance with the teaching of the present invention, the means for mounting the rotor frame of the instrument as shown in Figs. 1 and 2 includes a pair of spaced cantilever springs 20 and 21 having one end thereof secured to the casing 10. The spaced springs 20 and 21 are located at opposite ends of the casing 10 and project to a position along the axis 15. Also included in the mounting are a pair of torsion wires 22 and 23, one for each of the springs 20 and 21, which are fixed to opposite sides of the frame by means such as clamps 24. The wires extend longitudinally along the axis 15 and are respectively connected under tension to the free ends of the cantilever springs by means such as the adjustable clamps 25. The improved mounting provides an axis-defining means in the form of a pair of taut wires, the ends of which connect the rotor frame and the respective free ends of the cantilever springs. The wires are connected to load the springs, which places the same under sufficient tension to define the axis of the rotor frame or casing. The loaded cantilever springs yieldingly support the frame so that shock or vibration of the instrument along the axis of the frame is absorbed.

An alternative form of mounting is shown in Fig. 4, in which a single cantilever spring is employed with two wires. In this instance, cantilever spring 2 is replaced by a rigid post 26 fixed in position on the casing 10.

The rotor frame 12 of the instrument may be centralized by means of a spring mechanism indicated generally at 27, in Fig. 1. One part of this mechanism is fixed to the casing 10 by means of a bracket 28 and the other part is fixed to a yoke 29 that forms a part of the frame 12.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Means for mounting the rotor frame of a gyroscopic instrument in the casing thereof comprising a cantilever spring having one end thereof fixed to the casing, and a pair of axis-defining torsion wires fixed to opposite sides of the frame, one of which is connected to the free end of the cantilever spring and the other of which is fixed to the casing.

2. A support for the rotor frame of a gyroscopic instrument comprising axially disposed wires connected to opposite ends of said frame, means for exerting a tensile strain on both of said wires comprising a yielding supporting member for at least one of said wires.

3. A support for the rotor frame of a gyroscopic instrument comprising axially disposed wires connected to opposite ends of the frame, and a spring member disposed at one end of the frame adapted to exert a tensile strain on both of said wires.

4. A support for the rotor frame of a gyroscopic instrument comprising axially disposed wires connected to opposite ends of said frame, a supporting member individual to each of said wires, said supporting members cooperating so that both jointly tension both of said wires.

5. A support for the rotor frame of a gyroscopic instrument, a pair of torsion wires, means on the frame by which the wires may be secured near one end so that the wires extend along the axis of rotation of said frame, and separate means attached to said wires at the free ends thereof cooperating to jointly tension both wires.

6. A support for the rotor frame of a gyroscopic instrument comprising a pair of wires, clamping devices disposed at opposite ends of the frame for securing the respective wires near one end thereof, a pair of cantilever springs, each provided at one end with a clamp for securing the respective wires near their free ends whereby the springs are mutually effective to tension both wires and locate the axial position of the rotor frame.

7. A support for the rotor frame of a gyroscopic instrument comprising axially disposed wires connected to opposite ends of said frame, and means for exerting a tensile strain on both of said wires comprising a yielding support for the outer end of one of said wires.

8. Means for supporting the rotor frame of a gyroscopic instrument in a casing comprising a pair of wires, clamping devices disposed at opposite ends of the frame for securing the respective wires near one end thereof so that the wires extend outwardly in opposite directions along the axis of the frame, a pair of cantilever springs, each secured near one end to opposite sides of the casing, clamping means at the free ends of the cantilever springs, said clamping means being fastened respectively to said wires near the free ends thereof, the arrangement being such that the cantilever springs cooperate, each with the other, to tension both wires.

BYRON L. ALLISON.
LAN J. WONG.